(12) United States Patent
Kenum

(10) Patent No.: US 6,433,692 B1
(45) Date of Patent: Aug. 13, 2002

(54) ANIMAL ACTUATING SIGNALING DEVICE

(76) Inventor: Louis B. Kenum, 437 S. Mountain Dr., Trinity, AL (US) 35673-9511

( * ) Notice: Subject to any disclaimer, the term of this patent is extended or adjusted under 35 U.S.C. 154(b) by 47 days.

(21) Appl. No.: 09/669,701

(22) Filed: Sep. 26, 2000

(51) Int. Cl.[7] .............................................. G08B 23/00
(52) U.S. Cl. ................................... 340/573.3; 340/328
(58) Field of Search .............................. 340/573.3, 328, 340/329, 330, 539; 200/61.62, 61.7; 119/174

(56) References Cited

U.S. PATENT DOCUMENTS

| | | | |
|---|---|---|---|
| 4,323,883 A | 4/1982 | Sowards ..................... 340/328 |
| 4,400,696 A | 8/1983 | Klingensmith .............. 340/573 |
| 4,551,713 A | 11/1985 | Aossey ........................ 340/666 |
| 4,686,504 A | 8/1987 | German ....................... 340/328 |
| 4,908,484 A | * 3/1990 | Gunoff ........................ 200/331 |
| 5,303,677 A | 4/1994 | Jones .......................... 119/174 |
| 5,475,369 A | 12/1995 | Baker .......................... 340/573 |
| 5,604,478 A | 2/1997 | Grady et al. ................. 340/330 |
| 5,901,667 A | 5/1999 | Kallas ......................... 119/712 |
| 5,952,926 A | 9/1999 | Syverson ..................... 340/573 |

* cited by examiner

*Primary Examiner*—John Tweel
(74) *Attorney, Agent, or Firm*—Waddey & Patterson; John C. Garvin, Jr.

(57) ABSTRACT

The signaling device of the present invention, in its preferred embodiment, generally comprises a switch or activator mounted on a facing of a door, a receiver or doorbell mounted within a home or other building, and mechanism for sending a signal from the switch or activator to the receiver or doorbell. The switch or activator of the present invention is preferably made of clear LEXAN or polycarbonate material bent to a generally U-shape and incorporating a pair of brass contacts wired to a receiver. In lieu of being wired to a receiver, there might be a wireless connection between the switch or activator and the receiver. A pet animal can readily actuate the activator or switch by leaning or pressing against the activator or switch to alert someone within the home or other building that it desires to enter the home or building.

5 Claims, 1 Drawing Sheet

ANIMAL ACTUATING SIGNALING DEVICE

FIELD OF THE INVENTION

This invention relates to a signaling device which is operable by a pet animal such as a dog or cat for enabling the animal to attract the attention of someone in a house or other building when the animal desires to obtain entrance into the house or the building.

BACKGROUND OF THE INVENTION

Pet animals such as cats and dogs will normally state their desire to enter a house or other building by meowing, barking or by scratching the door. The meowing or barking can be annoying to nearby neighbors and others and is not always effective in that an occupant within the house or building may not be aware that the sole purpose of the meowing or barking is to gain entry to the house or building by the pet. Scratching at the door by the pet may cause damage to the door or an adjacent surface and is thus undesirable.

The provision of a small door within the door or in an adjacent surface for use by the pet is often considered to be an answer to the problem and will allow the pet to ingress and egress the house or other building at the desire of the pet. The provision of a second pet door is not always an effective solution as such separate pet door permits unrestricted ingress by the pet as well as other small animals which the occupant would not want to enter the house or other building.

Various signal sounding devices that are adapted specially for pet animal usages are known in the prior art. These devices are normally mounted or located at or near the entrance of a house or other building so that they can be actuated by the pet when it wants to gain entry in the house or other building. The actuator for these signaling devices are generally hard-wired, as are most doorbells, but located at a lower level so that the pet animal can activate the doorbell by pushing, pressing or leaning on the actuator. The signaling devices are often complicated in structure and can be easily damaged by the elements such as rain or snow. The devices disclosed in the following U.S. patents are exemplary of such prior art devices: Patent No. 4,323,883 to Sowards; 4,400,696 to Klingensmith; 4,686,504 to German; 5,303,677 to Jones; 5,475,369 to Baker; 5,901,667 to Kallas; and 5,952,926 to Syverson.

U.S. Pat. No. 4,323,883 to Sowards discloses a complex doorbell device which takes advantage of the natural characteristic of animals to scratch or paw at a scratch plate located on a closed door whenever they desire to enter a building or other structure wherein the scratching or pawing actuates an audible signal device. U.S. Pat. No. 4,400,696 to Klingensmith discloses a relatively complex doorbell device having a hinged panel member mounted on the outside of the door and having an electrical contact member secured thereto. Klingensmith requires an adjustable spring member built within the hinge structure. U.S. Pat. No. 4,686,504 to German discloses a pet operable annunciator secured on a wall adjacent a door comprising a housing including a sounding chime or bell and an actuating lever projecting outwardly from the housing with the entire housing being exposed to the weather which can be damaged by rain, snow or oxidation. U.S. Pat. No. 5,303,677 to Jones discloses a pet entrance pager that can be fitted over the vertical edge of a door and which has activating means which the pet may engage for sounding an alarm. U.S. Pat. No. 5,475,369 to Baker discloses an animal actuating signaling device comprising a wireless transmitter, a companion wireless receiver and a two piece housing for the wireless transmitter. U.S. Pat. No. 5,901,667 to Kallas discloses a portable doorbell for housepets to alert its caretaker of the need to exit a house or other building to relieve itself. U.S. Pat. No. 5,952,926 to Syverson discloses a pet doorbell apparatus comprising a cover cap activator for attachment to the outside of a house or other building. The cover cap activator includes a base plate and a cover pivotably mounted to the base plate. The cover is movable from a first position to a second position when the cover is depressed by an animal desiring to enter a house or other building to activate a transmitter which sends a signal to a receiver, bell, chime, or the like to alert a person within the house or other building to let the pet in.

While there are numerous pet doorbells in the prior art, including those disclosed in the above-identified U.S. patents, most are complex and can be damaged by the elements, and all suffer from numerous deficiencies and disadvantages. The present invention overcomes these deficiencies and disadvantages in that it provides an improved pet doorbell that fills the need for a simple, inexpensive, pet doorbell made from readily available, environmentally friendly, materials which can be assembled and installed by persons with little, if any mechanical skills.

SUMMARY OF THE INVENTION

"The signaling device of the present invention, in its preferred embodiment, generally comprises a switch or activator mounted on a facing of a door, a receiver or doorbell mounted within a home or other building, and means for sending a signal from the switch or activator to the receiver or doorbell. The switch or activator of the present invention is preferably made of environmentally friendly (rust proof, etc.) clear LEXAN or polycarbonate material bent to a generally U-shaped and incorporating a pair of brass contacts wired by a wiring harness to a receiver. In lieu of being wired to a receiver, there might be a wireless connection between the switch or activator and the receiver."

It is an object of the present invention to provide a new and improved signaling device for operation by a pet which has the advantages of the prior art devices and none of the disadvantages.

It is a further object of the present invention to provide a new and improved signaling device for operation by a pet which may be easily and efficiently manufactured from inexpensive and readily available materials.

It is yet a further object of the present invention to provide a new and improved signaling device for operation by a pet which is characterized by its simplicity of construction and ease of operation.

It is an additional object of the present invention to provide a new and improved signaling device for operation by a pet that is substantially non-corrosive, structurally sound, and that is simple and easy to train a pet to use.

Other objects, features and advantages of the present invention will become apparent from the following detailed description and from the appending drawings in which like numbers have been used to describe like parts throughout the several views.

DESCRIPTION OF THE PREFERRED EMBODIMENTS

Figure 1:
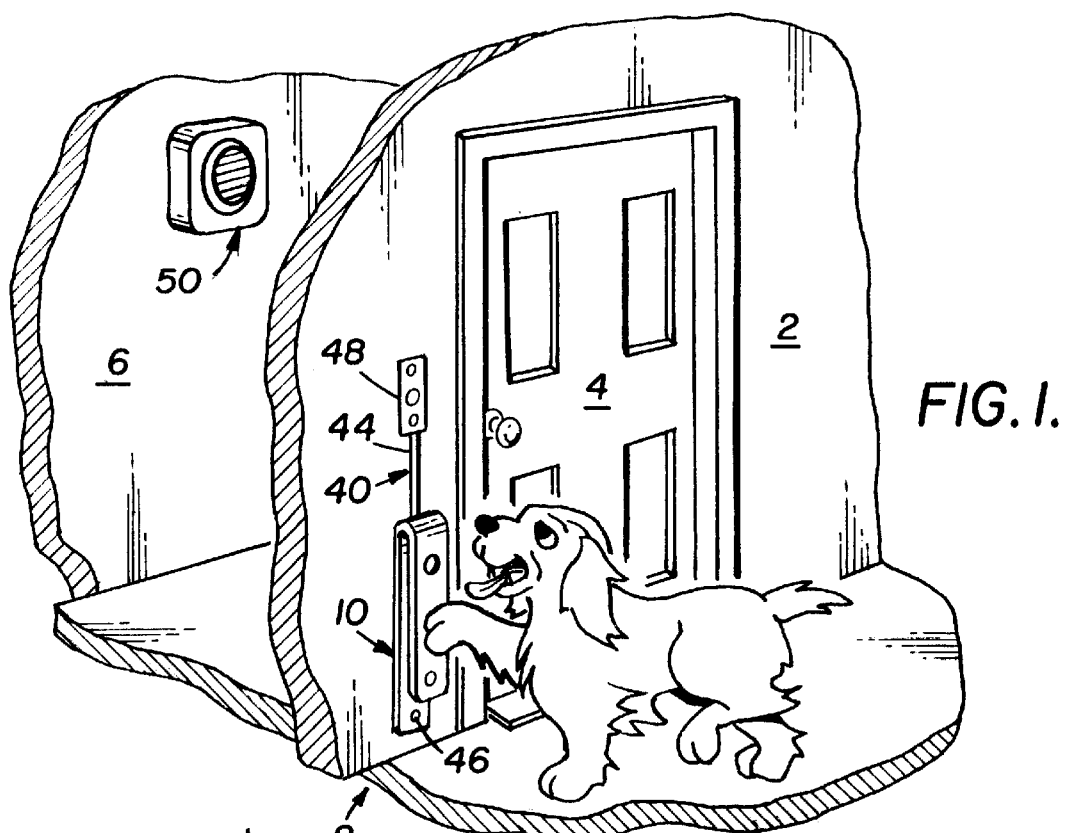
FIG. 1 is a perspective, partially broken away, view of a pet doorbell unit of the present invention mounted or located on an outside wall adjacent or near a door of a house or other building for use by a pet animal with the receiver for the unit shown located on a wall in the interior of the house or building.
Figures 2, 3:
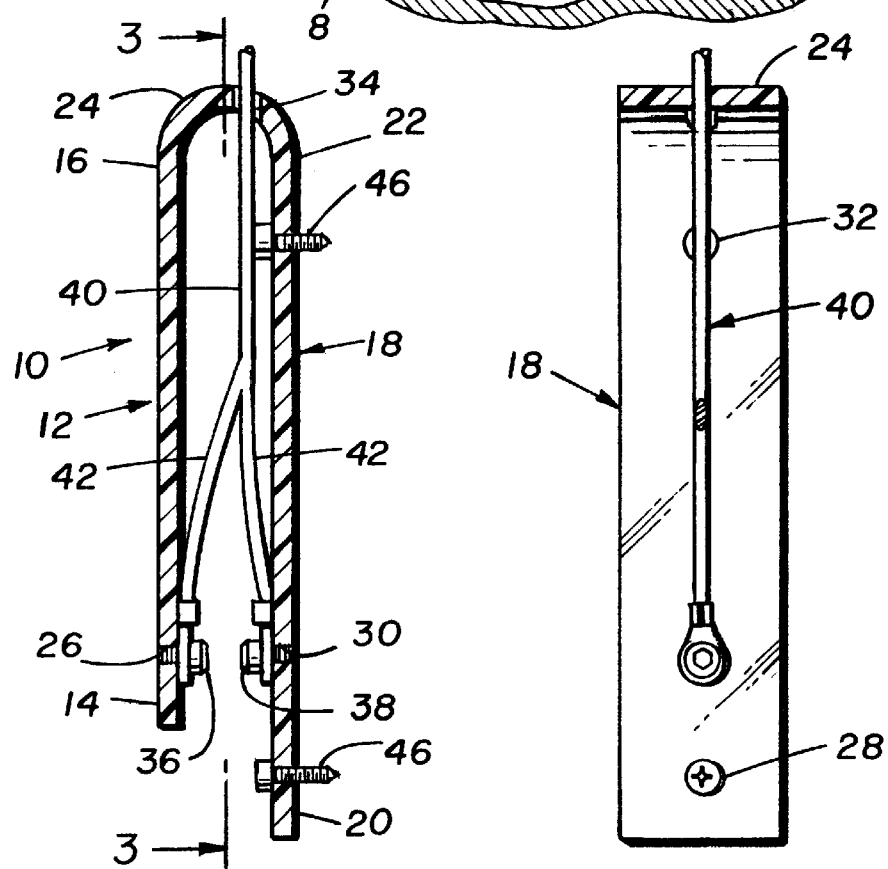
FIG. 2 is a side elevational, cross-sectional, view of the switch or activator for the pet doorbell unit of the present invention which can be either hardwired directly to the receiver unit, or tied into an existing doorbell switch for use by humans.
FIG. 3 is a cross-sectional view taken along line 3—3 of FIG. 2 showing the switch or activator for the pet doorbell of the present invention.

Referring now to the drawings, wherein like parts represents like parts throughout, reference numeral 8 generally designates the signaling device of the present invention. As best seen in FIG. 1, signaling device 8 generally comprises an activator or switch 10 mounted on a house or other building 2 adjacent an entranceway or door 4, a receiver or sounding device 50 mounted on a wall of a room 6 within the house or other building 2, and transmission means 40 for sending a signal from the activator or switch 10 to the receiver 50. As best seen in FIGS. 2 and 3, activator or switch 10 is a unitary, one piece, member which is generally U-shaped in configuration and includes an outer portion 12 having a lower end 14 and an upper end 16, an inner portion 18 having a lower end 20 and an upper end 22, and an intermediate portion 24 which connects the upper end 16 of outer portion 12 to upper end 22 of inner portion 18. As best seen in FIG. 2, a first opening 26 is located in the lower end 14 of outer portion 12, a second opening 28 (FIG. 3) and a third opening 30 is located in the lower end 20 of inner portion 18, a fourth opening 32 (FIG. 3) is located in the upper end 22 of inner portion 18, and a fifth opening 34 is located in the intermediate portion 24 which connects the upper end 22 of the inner portion 18 to the upper end 16 of outer portion 12. Further, as best seen in FIG. 2, a first brass contact 36 is threadly mounted in the first opening 26 in the lower end of 14 of outer portion 12 and a second brass contact 38 is threadly mounted in the third opening 30 in the lower end 20 of inner portion 18. Still further, as best seen in FIGS. 1–3, a wiring harness or transmission means 40 having a bifurcated lower end 42 and an upper end 44 is provided. The activator or switch 10 is secured to the building 2 by screws 46 which pass through the openings 28 and 32 in the inner portion 18. As shown in FIG. 1, the upper end 44 of the wiring harness 40 passes through the opening 34 (FIG. 2) in the intermediate connecting portion 24 and is hardwired into a doorbell switch or activator 48 located at a higher and convenient level for use by a human. With this arrangement a signal can be transmitted to the receiver 50 by either a pet animal engaging switch or activator 10 or a human engaging switch or activator 48. As an alternative, the wiring harness 40 could be tied in directly to the receiver 50 with a transformer (not shown) being inserted or tied in the wiring harness 40. A typical doorbell and/or chime wiring or installation is described on pages 106 and 107, under the title "Low Voltage for Door Chimes" in *BASIC WIRING* in the Home Repair and Improvement works by the Editors of Time-Life Books, Alexandria, Va. It is to be understood and is apparent that the animal activating signaling device of the present invention can be used with a wireless transmitter such as those disclosed in U.S. Pat. No. 5,475,369 to Baker and U.S. Pat. No. 5,952,926 to Syverson.

In use, the activator or switch 10 is secured to an outer wall of a house or other building 2 adjacent an entranceway 4 at a height that is readily accessible to a pet animal such as a dog or cat as shown in FIG. 1. When the pet animal desires to come into the house or building 2, a pet animal can alert someone in the house or building 2 that it wants in by pressing or leaning against the outer portion 12 of the switch or activator 10, thereby moving the brass contact 36 into engagement with the brass contact 38 to transmit an audible signal to the receiver 50 within the house or building 2. The person within the house or building 2 is thus alerted that the pet animal or possibly a visitor (where the normal doorbell switch 48 is tied in with the activator of switch 10) to come to the entranceway 4 to let the pet animal or visitor in.

As indicated, the switch or activator 10 can be made of LEXAN or a polycarbonate material or any other material that can be formed into a U-shape and has the characteristic of being resilient or elastic such that it can be readily deformed when pressure is applied thereto, but will readily return to its original shape when the pressure is released.

The foregoing is considered to be illustrated only of the principles and operation of the instant invention. It is therefore apparent that numerous modifications and changes will readily occur to those skilled in the art, and that it is not intended to limit the instant invention to the exact construction and operation shown and described, and accordingly all suitable modifications and equivalents may be resorted to, falling within the scope of the invention.

What is claimed is:

1. An animal actuating signaling apparatus for a building having at least one room and one entranceway, said apparatus comprising:

a. a hingeless, one-piece, displaceable and resilient activator, means for mounting said activator adjacent said at least one entranceway, said activator being normally U-shaped and having an outer portion having an upper and a lower end, an inner portion having an upper and lower end, and, an intermediate portion integral with said upper end of said outer portion and said upper end of said inner portion, said intermediate portion being of the same width and thickness as said inner and outer portions, said inner portion being parallel to and spaced apart from said outer portion when said activator is in its normal U-shape condition, said outer portion being noveable to a first position under pressure by an animal due to its resiliency and automatically returnable to its normal U-shape condition responsive to release of said animal pressure, said means for mounting said activator including at least one opening in said inner portion and a threaded screw for passing through said at least one opening and into said building;

b. a discrete pair of electrical contact means mounted on the facing surfaces of said inner and outer portions of said activator, said electrical contact means being disposed for contact therebetween responsive to movement of said outer portion of said activator to it said first position;

c. a wiring harness including a first bifurcated end connected to respective said electrical contact means mounted on the facing surfaces of said inner and outer portions of said activator for generating a signal responsive to pressure by the animal with said signal being automatically terminated responsive to release of said animal pressure, and, thus return of said outer portion of said activator to its normal U-shape condition; and d. receiver means within the building and mounted in the at least one room for receiving said signal transmitted from said activator through said wiring harness.

2. The animal actuating signaling apparatus of claim 1 wherein said hingeless, one-piece, activator is made of LEXAN bent into said U-shape.

3. The animal actuating signaling apparatus of claim 1 wherein said hingeless, one-piece, activator is made of a polycarbonate material bent into said U-shape.

4. The animal actuating signaling apparatus of claim 1 wherein said wiring harness has a second bifurcated end wired to a transformer and to said receiver means within the building.

5. The animal actuating signaling apparatus of claim 1 wherein said wiring harness is further wired to a conventional doorbell switch disposed at a higher level for use by a human.

* * * * *